United States Patent [19]

White

[11] 4,239,282
[45] Dec. 16, 1980

[54] PILOT SEAT

[75] Inventor: Thomas H. White, Issaquah, Wash.

[73] Assignee: The Boeing Company, Seattle, Wash.

[21] Appl. No.: 970,725

[22] Filed: Dec. 18, 1978

[51] Int. Cl.² ............................ A47C 7/46; A47C 7/54
[52] U.S. Cl. ...................................... 297/284; 297/411
[58] Field of Search ............... 297/284, 411, 418, 348, 297/417; 248/422

[56] References Cited

U.S. PATENT DOCUMENTS

| | | | |
|---|---|---|---|
| 7,687 | 5/1877 | Morrison | 297/411 |
| 281,494 | 7/1883 | Groebl | 248/422 X |
| 2,139,028 | 12/1938 | Mensendieck | 297/284 |
| 2,647,560 | 8/1953 | Huebener | 297/411 X |
| 3,463,544 | 8/1969 | Froelich | 297/284 |
| 3,833,257 | 9/1974 | Dove | 297/284 |
| 3,880,463 | 4/1975 | Shephard et al. | 297/284 |
| 3,924,894 | 12/1975 | Rabinowitz | 297/411 X |
| 3,948,558 | 4/1976 | Obermeier et al. | 297/284 |
| 4,139,235 | 2/1979 | Elbert | 297/284 |

Primary Examiner—Francis K. Zugel
Attorney, Agent, or Firm—H. Gus Hartmann; Bernard A. Donahue

[57] ABSTRACT

A pilot seat or the like provided with lumbar support and armrests. Research into the anthropometry has revealed that the height of the armrest and the center of the lumbar support of people between 5'2" and 6'3" are practically the same. Accordingly, a unitary adjustment means is provided for simultaneously raising or lowering the armrests and the lumbar support.

9 Claims, 3 Drawing Figures

PILOT SEAT

BACKGROUND OF THE INVENTION

This invention relates generally to pilot or crew seats and particularly relates to such a seat assembly having a unitary adjustment for both the lumbar support and the armrests.

Many chairs or seat assemblies have been devised in the past. Many of these, as evidenced by prior patents, have separate adjustments for the armrests of the seat assembly and for a lumbar support. For example, the patent to Leonard, U.S. Pat. No. 840,348 shows armrests rigidly connected to the chair back. It further reveals adjustment means for raising or lowering the armrests simultaneously with the back.

The patent to Rabinowitz et al., U.S. Pat. No. 3,924,894 discloses a combined armrest and lower back support. However, the dental chair shown and disclosed therein does not feature any adjustment for either armrests or back.

Another posture chair and seat is disclosed in the patent to Huebener, U.S. Pat. No. 2,647,560. In this case separate adjustment means are provided for both the backrest and the armrests. Also, the adjustments are not readily accessible to the person occupying the chair.

SUMMARY OF THE INVENTION

In accordance with the present invention there is provided a unitary adjustment means for both the lumbar support and the armrests of a pilot or crew seat assembly. The invention is based on research into the anthropometry of flight crews and the like. This has revealed that the dimensions for the height of the armrest and the center of the lumbar support are substantially the same for 5'2" to 6'3" persons. It will hence be evident that combining the two adjustments into a unitary structure simplifies the design, cuts cost and weight and simplifies the adjustment of the seat.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
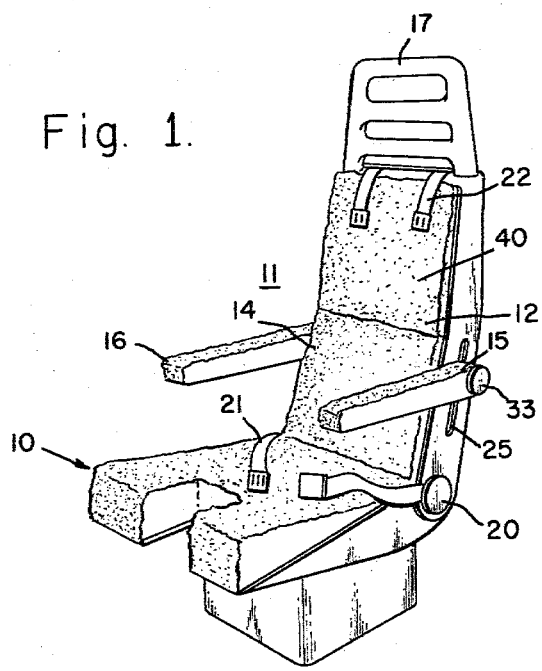
FIG. 1 is a view in perspective from the front of a seat assembly in accordance with the present invention.

Referring now to the drawings and particularly to FIG. 1, there is illustrated a seat assembly embodying the present invention. The seat assembly includes a seat portion 10 and a backrest 11 consisting of two sections 12 and 14. Furthermore, the seat assembly is provided with two armrests 15 and 16. There may further be provided a headrest 17 which may be retracted into a suitable slot in the upper section 12 of the backrest. As clearly shown in FIG. 1, there may be provided a hand wheel or adjustment knob 20 by means of which the backrest 11 may be tilted backwards or forwards as is conventional. Such an adjustment is shown in the patent to Mensendieck et al., U.S. Pat. No. 2,139,028. Furthermore, the seat assembly may have a lap belt 21 and a shoulder harness 22 as is conventional.

Figure 2:
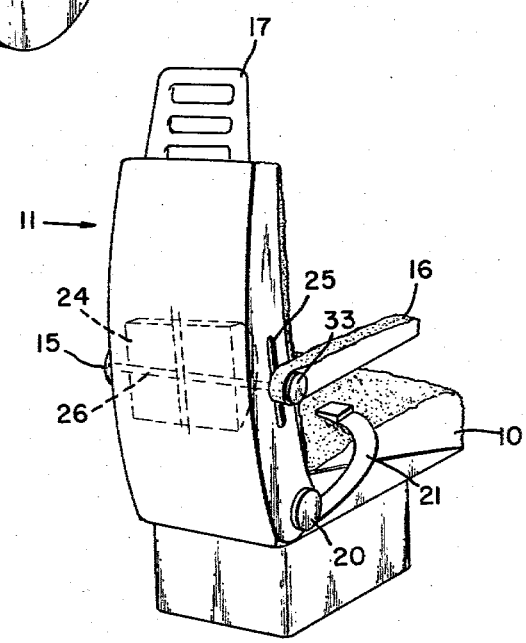
FIG. 2 is a view in perspective of the rear of the seat assembly to show particularly the adjustment of the lumbar support and the armrests.

In accordance with the present invention the two arm rests 15 and 16, as well as a lumbar support 24 shown in FIG. 2, are simultaneously adjusted either up or down. By way of example, the arm rests may normally have a distance of 9" from the seat pan 10. It is desirable to adjust the armrests 15 and 16 one inch up or one inch down from their normal position. At the same time the lumbar support 24 will also be adjusted up and down in unison with the adjustment of the armrests 15 and 16. To this end the rear of the backrest 11 is provided with a suitable vertical slot 25 which permits a shaft 26 to move up and down, the shaft being shown in FIG. 3. The shaft 26 passes through the two armrests 15 and 16 and accordingly they move up and down together with the shaft 26. At the same time the lumbar support 24 is secured to the shaft 26, the shaft being permitted to rotate within the lumbar support 24.

For purposes of adjustment there is provided a fixed adjustment rack 27 with which meshes a pinion gear 28. However, the pinion gear 28 is normally locked by a locking rack 30 which is relatively narrow with respect to the adjustment rack 27 and disposed adjacent and parallel thereto.

Figure 3:
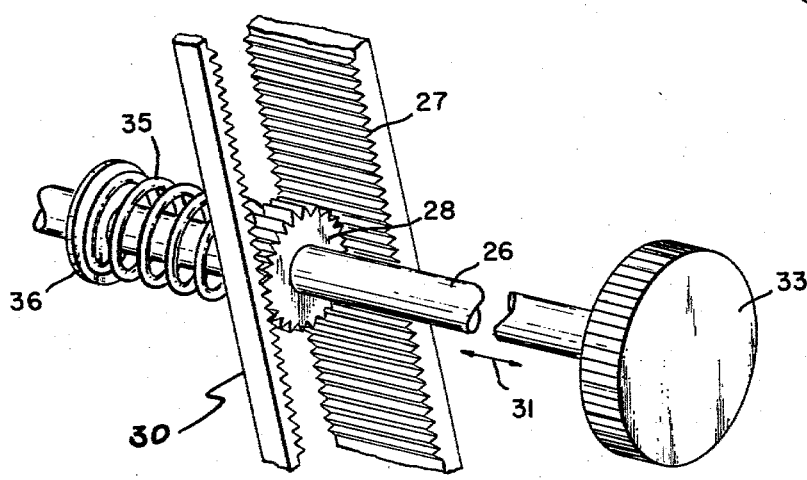
FIG. 3 is a view on enlarged scale of the rack and pinion mechanism for simultaneously adjusting the positions of the armrests and the lumbar support.

Hence in order to adjust the positions of the two armrests 15, 16 and of the lumbar support 24, it is necessary to move the shaft 26 towards the right of FIG. 3 as shown by arrow 31. This will disengage the pinion gear 28 from the locking rack 30 and permit the pinion gear to be rotated thereby to move the shaft 26 up or down. To this end there is provided an adjustment knob 33 secured to the shaft 26 and which may be outwardly knurled as shown.

When the proper adjustment has been made the adjustment knob 33 is released whereupon the pinion gear 28 is pulled toward the left by a spring 35 which bears against a stop 36.

It will thus be seen that by merely pulling out the knob 33 both armrests 15 and 16, as well as the lumbar support 24, may be moved up or down to suit the particular person occupying the seat assembly. This adjustment may readily be performed by the person sitting on the seat assembly.

As clearly shown in FIG. 1, the seat 10, the backrest 11 and the two armrests 15 and 16 are preferably covered with sheepskin or lambs wool as shown at 40. The thickness of the lambs wool may be on the order of 2 cm. It has been found that sheepskin absorbs moisture much more readily than plastic materials such as foam or fiber. At the same time the moisture evaporates even faster. This, of course, means that the person occupying the seat assembly of the invention keeps his back dry and cool. Lambs wool basically consists of a large number of tiny curled springs. Therefore, the body weight is evenly distributed over the surface of the seat. Hence the creation of pressure spots and the like is avoided. Since the air circulates freely through the wool there is no buildup of heat or moisture.

It will be realized that this unitary adjustment mechanism simplifies the design, reduces cost and weight and particularly facilitates adjustment of the seat assembly.

What is claimed is:

1. A seat assembly particularly adapted for a pilot comprising:
   (a) a seat portion;
   (b) a backrest;
   (c) a pair of armrests;
   (d) said backrest having a separately adjustable lumbar support;
   (e) said armrests being interconnected to said lumbar support for unison adjustment therewith, relative to said backrest;
   (f) unitary adjustment means coupled to both said armrests and said lumbar support for simultaneously raising or lowering said armrests and said lumbar support.

2. A seat assembly as defined in claim 1, further including means coupled to said adjustment means and extending outside of one of said armrests within reach of the hand of a person on said seat, for operating said adjustment means.

3. A seat assembly as defined in claim 2, wherein said adjustment means includes a rack and pinion, said pinionqbeing secured to said hand wheel.

4. A seat assembly as defined in claim 1, wherein means are provided for rotating said backrest with respect to said seat portion.

5. A seat assembly as defined in claim 4, wherein said means for rotating said backrest includes a hand wheel disposed on said seat portion and accessible to the hand of a person on said seat.

6. A seat assembly as defined in claim 1, wherein said backrest is provided with an inwardly extending slot and a headrest retractable into said slot.

7. A seat assembly as defined in claim 1, wherein said seat portion, said backrest, and said armrests are covered with lamb's wool having a thickness of approximately 2 centimeter.

8. A seat assembly as defined in claim 3, wherein locking means are provided for locking said rack and pinion in a desired position.

9. A seat assembly as defined in claim 8, wherein said locking means includes a locking rack so disposed as to lock said pinion with the first mentioned rack and means for moving said pinion into and out of engagement with said locking rack.

* * * * *